United States Patent [19]

Kwon

[11] Patent Number: 5,890,208
[45] Date of Patent: Mar. 30, 1999

[54] COMMAND EXECUTING METHOD FOR CD-ROM DISK DRIVE

[75] Inventor: Young-sig Kwon, Kyungki, Rep. of Korea

[73] Assignee: Samsung Electronics Co., Ltd., Kyungki-Do, Rep. of Korea

[21] Appl. No.: 759,954

[22] Filed: Dec. 3, 1996

[30] Foreign Application Priority Data

Mar. 30, 1996 [KR] Rep. of Korea ..................... 1996-9575

[51] Int. Cl.⁶ ............................ G06F 12/00; G06F 13/14
[52] U.S. Cl. ........................... 711/112; 395/874; 395/872
[58] Field of Search ................................ 711/111, 154, 711/165, 112; 395/872, 873, 874

[56] References Cited

U.S. PATENT DOCUMENTS

| | | | |
|---|---|---|---|
| 5,548,795 | 8/1996 | Au ............................................ | 395/872 |
| 5,551,002 | 8/1996 | Rosich et al. ............................ | 711/134 |
| 5,603,063 | 2/1997 | Au ............................................ | 395/872 |
| 5,623,693 | 4/1997 | Ashton et al. ........................... | 395/825 |
| 5,644,786 | 7/1997 | Gallagher et al. ...................... | 395/850 |
| 5,664,143 | 9/1997 | Olbrich ................................... | 711/112 |
| 5,664,224 | 9/1997 | Davis ....................................... | 395/842 |
| 5,696,921 | 12/1997 | Holt .......................................... | 711/4 |

Primary Examiner—Tod R. Swann
Assistant Examiner—Conley B. King, Jr.
Attorney, Agent, or Firm—Sughrue, Mion, Zinn, Macpeak & Seas, PLLC

[57] ABSTRACT

A CD-ROM disk drive receives commands from a host computer. In order to speed up the data accessing response time of the CD-ROM, a method is provided for rearranging the order in which the commands received from the host computer access data contained in sequentially enumerated blocks on the CD-ROM in the disk drive. According to the disclosed method, three queues are set up for holding the logical block addresses of blocks which are to be accessed by the received commands. An execution queue stores addresses of disk blocks to be accessed by a currently executed command. A wait queue stores addresses of disk blocks to be accessed by the next command after the commands accessing addresses of disk blocks stored in the execution queue. A free queue stores addresses of disk blocks to be accessed by the continuously transmitted commands. More time efficient accessing of data from the CD-ROM is accomplished by rearranging the execution queue such that the blocks stored in the wait queue are, one at a time, inserted into the execution queue in a sequential order. In this way, it is made possible for a large number of accessing operations of the drive to be performed at blocks on the CD-ROM which are in a sequential order.

4 Claims, 5 Drawing Sheets

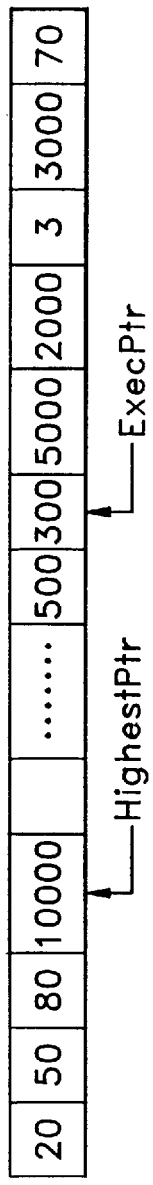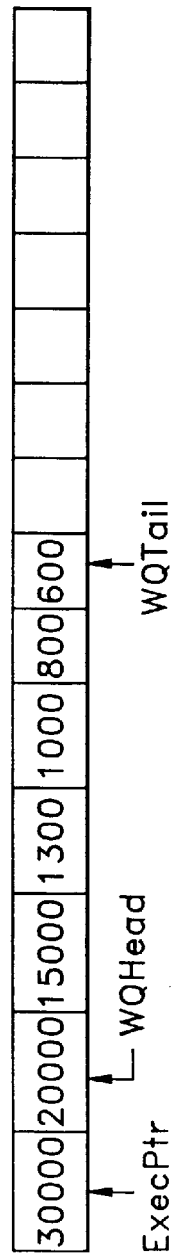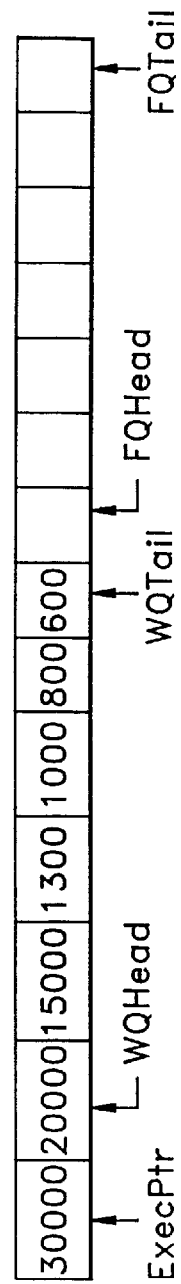

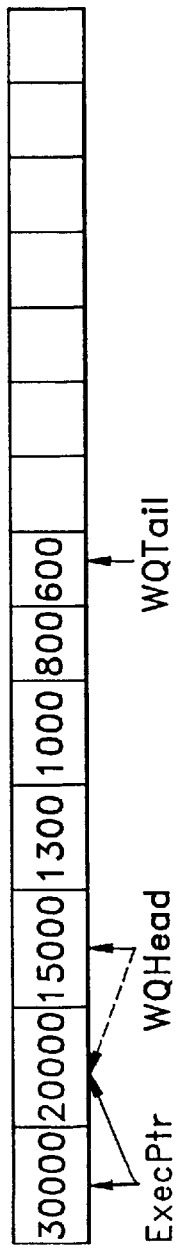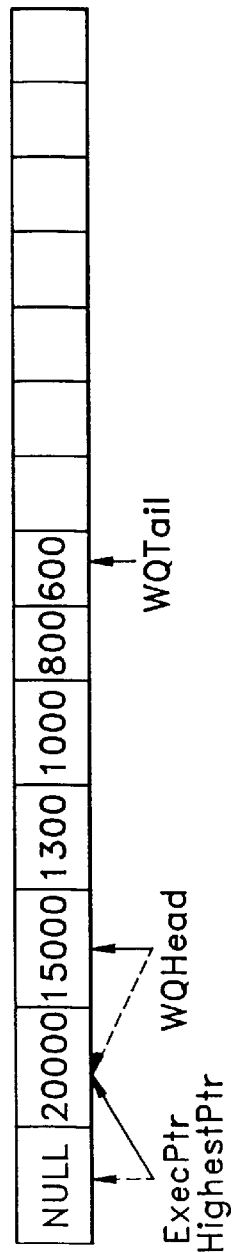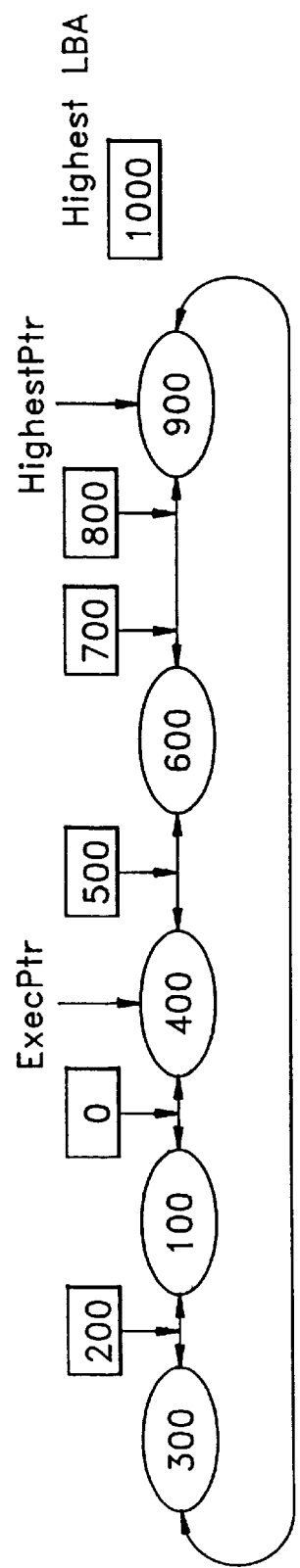

COMMAND EXECUTING METHOD FOR CD-ROM DISK DRIVE

BACKGROUND OF THE INVENTION

The present invention relates to a CD-ROM disk drive. More particularly, the present invention relates to a method for executing a command in a CD-ROM disk drive wherein a command is executed after adjustment of the address which is to be accessed on the disk. The present application for a command executing method for CD-ROM disk drive is based upon Korean Patent Application No. 96-9575 which is incorporated herein by reference for all purposes.

A CD-ROM, like a music CD, is a disk having a diameter of 12 cm and a storage capacity of 680 MB and is read from using a laser. CD-ROM disk drives are classified according to the type of data transmission between the CD-ROM disk drive and its host computer. Thus, CD-ROM disk drives are largely classified as an AT-BUS type, a SCSI (small computers system interface) type, or an Enhanced IDE (enhanced-integrated development environment) type.

FIG. 1 schematically shows a structure of a CD-ROM disk drive. Referring to FIG. 1, the disk drive has a spindle motor 12 for rotating a disk 11 positioned on a turntable 10 and a pickup device 13 for reading information recorded on the disk 11. A CPU 14 controls the entire system. A servo signal processor (SSP) 15 drives the spindle motor 12 and receives the signal read by the pickup device 13 to transmit the received signal to the CPU 14.

However, in the conventional CD-ROM disk drive having such a structure, since the commands transmitted from a host computer are sequentially executed and there is no function of rearranging these commands in the CD-ROM disk drive, the speed required for performing some commands, such as track search or data access in a disk, becomes slow.

SUMMARY OF THE INVENTION

To solve the above problem, it is an object of the present invention to provide a method for executing commands in a CD-ROM disk drive in which command execution speed is improved upon by determining and rearranging the commands transmitted from a host computer.

Accordingly, to achieve the above object, there is provided a method for executing a command transmitted from a host computer to access data of a disk in a CD-ROM disk drive wherein the area of the disk is divided into units of blocks, each block being assigned to an address, and the CD-ROM disk drive accesses data in the block by designating the corresponding address, said method comprising the steps of: (a) generating an execution queue for storing addresses of disk blocks to be accessed by a currently executed command, a wait queue for storing addresses of disk blocks to be accessed by the next command accessing addresses of disk blocks after the command stored in the execution queue and a free queue for storing addresses of disk blocks to be accessed by the continuously transmitted commands; (b) sequentially arranging the block addresses stored in the execution queue; (c) sequentially arranging the block addresses stored in the wait queue; (d) rearranging the content of the execution queue by inserting the block addresses stored in the wait queue in the execution queue so as to be sequentially arranged; and (e) accessing the data corresponding to the block addresses stored in the rearranged execution queue.

According to the present invention, the data access speed necessary for performing commands is enhanced. This enhancement is accomplished by using a plural queue structure to rearrange the order of execution of the commands received from a host computer according to the sequence of the logical block addresses (LBA's) of the CD-ROM disk which is to be searched.

BRIEF DESCRIPTION OF THE DRAWINGS

The above object and advantages of the present invention will become more apparent by describing in detail a preferred embodiment thereof with reference to the attached drawings in which:

FIG. 2 is a diagram illustrating an execution queue;

FIG. 3 is a diagram illustrating a wait queue;

FIG. 4 is a diagram illustrating a free queue;

FIG. 5 is a diagram showing a command execution state where an execution pointer is not null;

FIG. 6 is a diagram showing a command execution state where an execution pointer is null;

FIG. 9 is a diagram illustrating the execution queue arranged in a circular shape.

DETAILED DESCRIPTION OF THE INVENTION

Figure 1:
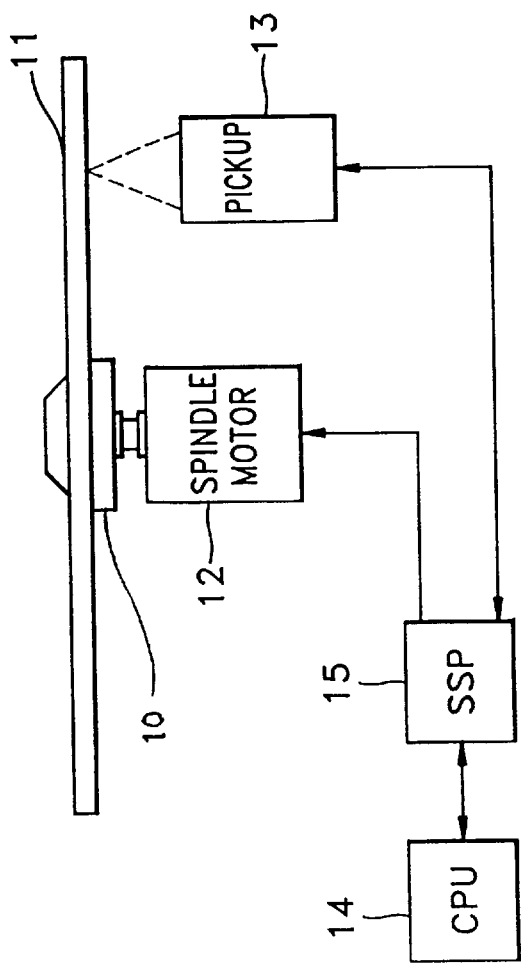
FIG. 1 is a block diagram schematically illustrating a structure of a CD-ROM disk drive.

FIGS. 2, 3 and 4 show a queue structure relating to a command execution method for a CD-ROM disk drive according to the present invention. Here, FIGS. 2, 3 and 4 illustrate the structures of a execution queue, a wait queue, and a free queue, respectively.

A disk drive contains the execution queue, the wait queue and the free queue for executing commands transmitted from a host computer after rearranging the commands. Here, the queue is a linear list having an order in which an element input occurs only at one end and an element output occurs only at the other end, i.e., a first-in first-out (FIFO) type.

The execution queue, which is used during the execution of commands, stores the logical block addresses (LBA) of disk blocks which are to be accessed by their corresponding commands when those commands are executed. The disk is divided into units of a block and each block is assigned a serial number. The LBA is an address for a disk drive to access data in a block of the disk having a corresponding serial number. In the execution queue, an execution pointer (ExecPtr) indicating the position of the next address to be accessed by the currently executed command and a highest pointer (HighestPtr) indicating the queue position of the highest LBA are employed. During the initialization of a CD-ROM disk drive, the ExecPtr and the HighestPtr are set to "0" or (null), respectively.

The wait queue stores the LBA's of disk blocks to access according to the next subsequent commands to be executed after the commands accessing addresses of disk blocks stored in the execution queue. In the wait queue, pointers (WQHead and WQTail) for the first LBA and the last LBA to be executed are employed.

The free queue is a supplementary blank queue for storing the LBA's disk blocks to be accessed according to the continuously transmitted commands. In the free queue, the first and the last free pointers (FQHead and FQTail) are employed.

When such a queue configuration is completed, commands for accessing data stored on a disk are transmitted from a host computer and the LBA's of the disk which are to be accessed by those commands are stored in the queues.

The process of executing commands according to the contents stored in the queues will now be described referring to FIGS. 5 and 6.

In FIG. 5, when an LBA indicated by the ExecPtr is not null, the data corresponding to the LBA indicated by the ExecPtr is accessed. In FIG. 6, when an LBA indicated by the ExecPtr is null, the ExecPtr moves to the WQHead and it is determined whether an LBA indicated by the WQHead is null or not. If it is not null, the data corresponding to the LBA indicated by the pointer WQHead is accessed.

When the ExecPtr and the HighestPtr are both null, the execution queue, the wait queue and the free queue are all in an empty state. In this case, the disk drive performs an idle loop to continuously check whether a new command is transmitted from the host computer and waits until the new command is transmitted.

Figure 7:
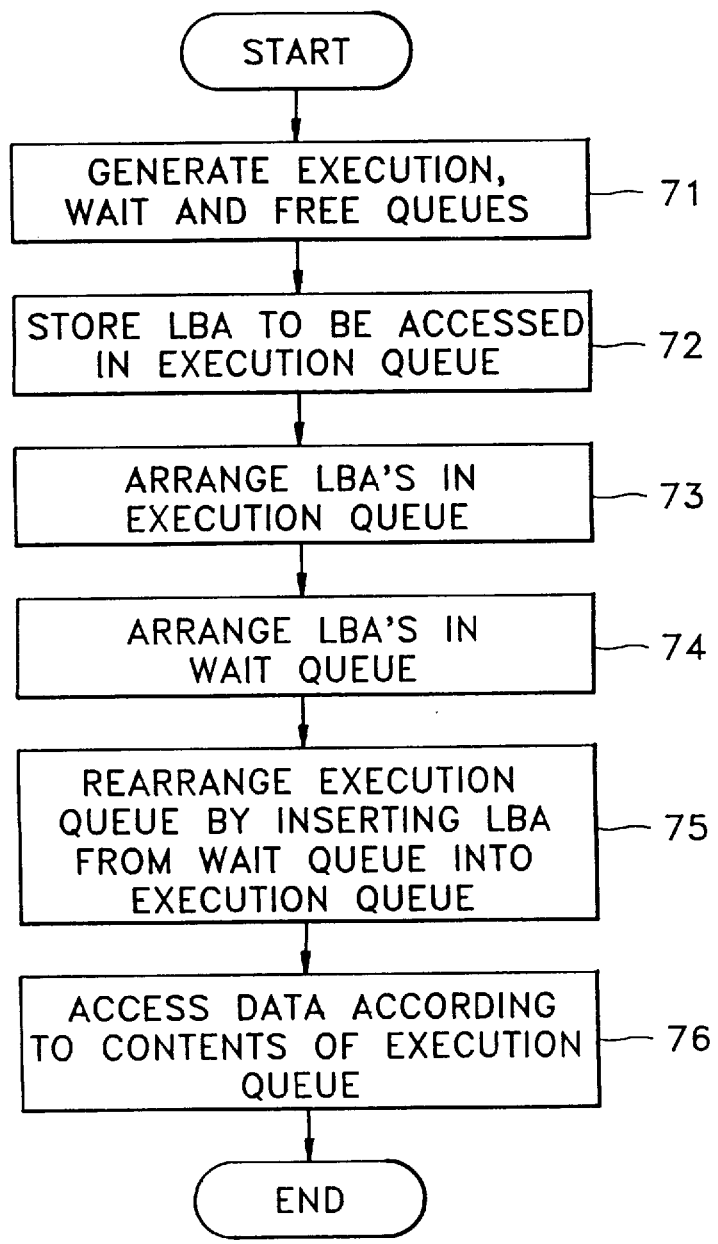
FIG. 7 is a flow chart outlining a command execution method according to the present invention.

The process of rearranging the LBA stored in the queues and accessing data in the disk for execution of the commands received by the disk drive will be described referring to FIG. 7.

First, the execution queue, the wait queue and the free queue, as described above, are generated in step 71. The LBA's of the disk which are to be accessed according to commands transmitted from the host computer are stored in the queues, in step 72. The LBA's stored in the execution queue are sequentially arranged, in step 73, and the LBA's stored in the wait queue are also sequentially arranged, in step 74. The LBA's stored in the wait queue are inserted into the execution queue and the content of the execution queue is rearranged to be in order, in step 75. The disk drive accesses the data corresponding to the LBA's stored in the rearranged execution queue, in step 76.

Figure 8:
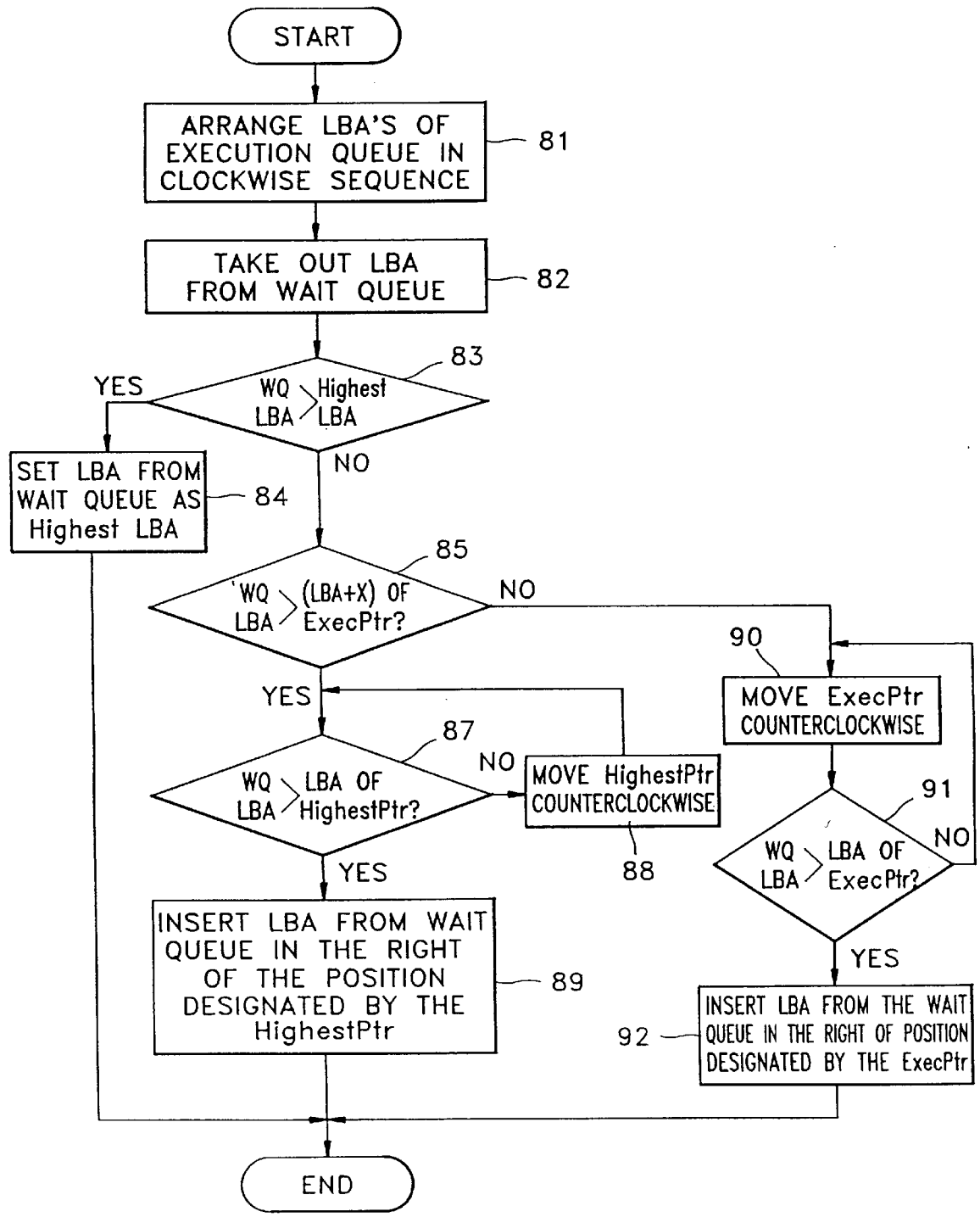
FIG. 8 is a flow chart outlining a method for rearranging the contents of the execution queue.

FIG. 8 is a flow chart outlining a method for rearranging the contents of the execution queue and FIG. 9 is a diagram illustrating the execution queue arranged in a circular shape. In FIG. 9, the square blocks represent a position for inserting the indicated LBA of the wait queue into the execution queue.

First, the execution queue is arranged in a circular form and the LBA's are arranged in a clockwise sequence in the execution queue, in step 81. An LBA stored in the wait queue is taken out, in step 82. The LBA from the wait queue is inserted into the execution queue so as to rearrange the queue contents in order of address, as follows. When the LBA taken out of the wait queue is greater than the LBA designated by the HighestPtr, the LBA from the wait queue is set as the highest LBA, in steps 83 and 84. The highest LBA becomes the next LBA to be executed after the execution of the contents of the current execution queue.

When the LBA from the wait queue is not greater than the LBA designated by the HighestPtr, it is determined whether the LBA from the wait queue is greater than (LBA+X) indicated by the ExecPtr (here, X denotes the block designation corresponding to the current LBA to be read by the disk drive), in step 85. If the LBA from the wait queue is greater than (LBA+X) and less than that of the HighestPtr (step 87), the HighestPtr is moved counterclockwise, in step 88, and the LBA of the HighestPtr and that from the wait queue are again compared in step 87. Steps 87 and 88 form a loop which seeks the state where the LBA from the wait queue is greater than the LBA in the execution queue position indicated by HighestPtr. Then, when the LBA from the wait queue is greater than that of the HighestPtr position, the LBA from the wait queue is inserted into the right of a position designated by the HighestPtr, in step 89.

If the LBA from the wait queue is not greater than the (LBA+X) indicated by the ExecPtr (Step 85), the ExecPtr is moved counterclockwise to the left of the ExecPtr, in step 90, and the LBA of the ExecPtr and that from the wait queue are compared, in step 91. Steps 90 and 91 form a loop which seeks the state where the LBA from the wait queue is greater than the LBA in the execution queue position indicated by ExecPtr. Then, when the LBA from the wait queue is greater than that of the ExecPtr, the LBA from the wait queue is inserted in the right of a position designated by the ExecPtr, in step 92.

The contents of the execution queue are sequentially rearranged, by repeating the above process step by step with respect to the other LBA's stored in the wait queue.

Thereafter, while the ExecPtr is moved clockwise in the rearranged execution queue, the data of each disk block corresponding to the LBA stored in that particular position on the execution queue is accessed. At this time, if the position of the ExecPtr is the same as that of the HighestPtr, the ExecPtr and the HighestPtr move together.

As described above, in the command executing method for a CD-ROM disk drive according to the present invention, the LBA's of the CD-ROM disk, which are to be accessed in order to execute a command transmitted from a host computer in the CD-ROM disk drive, are rearranged in queue so that the data access speed for executing commands is improved.

Although the method of the present invention has been described according to a preferred embodiment, it will be appreciated that numerous modifications and changes may be made to the described embodiment without departing from the spirit and scope of the present invention.

What is claimed is:

1. A method for executing commands transmitted from a host computer to access data of a disk in a CD-ROM disk drive wherein the area of the disk is divided into units of blocks, each block being assigned a corresponding address, and the CD-ROM disk drive accesses data in the block by designating the corresponding address, said method comprising the steps of:

(a) generating an execution queue for storing addresses of disk blocks to be accessed by a currently executed command, a wait queue for storing addresses of disk blocks to be accessed by the next command after commands accessing addresses of disk blocks stored in the execution queue and a free queue for storing addresses of disk blocks to be accessed by the continuously transmitted commands;

(b) sequentially arranging the block addresses which have been stored in the execution queue;

(c) sequentially arranging the block addresses which have been stored in the wait queue;

(d) rearranging the content of the execution queue by inserting the block addresses stored in the wait queue in the execution queue so as to be sequentially arranged; and (e) accessing data of the disk corresponding to the block addresses stored in the execution queue which has been rearranged according to step (d).

2. The method for executing a command in a CD-ROM disk drive as claimed in claim 1, wherein said data accessing step further comprises the step of performing an idle loop for determining if a new command is transmitted from the host computer when the contents of said execution queue, said wait queue and said free queue are all null.

3. The method for executing a command in a CD-ROM disk drive as claimed in claim 1, wherein said execution queue employs an execution pointer for designating a block address to currently access data and a highest pointer indicating the highest block address in the execution queue; and wherein said step (d) includes the steps of:
(d1) forming said execution queue in a circular form and arranging block addresses in a clockwise sequence in said execution queue;
(d2) taking out one block address from said wait queue;
(d3) setting the address taken from said wait queue as a highest block address when the block address taken out from said wait queue is greater than that designated by the highest pointer;
(d4) determining whether the block address taken from said wait queue is greater than the block address designated by the execution pointer;
(d5) if the block address from said wait queue is greater than that of the execution pointer, repeatedly comparing the block address taken from said wait queue and that of the highest pointer while moving the highest pointer counterclockwise until the block address from the wait queue is greater than the block address at the highest pointer, and then inserting the block address from said wait queue in the right of the position designated by the highest pointer;
(d6) if the block address from said wait queue is not greater than that of the execution pointer, repeatedly comparing the block address from said wait queue and that of said execution pointer while moving the execution pointer counterclockwise until the block address from the wait queue is greater than the block address at the execution pointer, and then inserting the block address from said wait queue in the right of the position designated by the execution pointer;
(d7) sequentially taking out the other addresses stored in said wait queue and rearranging the contents of said execution queue by repeating said steps (c) through (f) for each address stored in the wait queue; and
(d8) moving the execution pointer in said rearranged execution queue in one direction and accessing the data corresponding to the block address designated by the execution pointer.

4. A method for executing a command transmitted from a host computer to access data of a disk in a CD-ROM disk drive wherein the area of the disk is divided into units of blocks, each block being assigned a corresponding address, and the CD-ROM disk drive accesses data in the block by designating the corresponding address and includes an execution queue for storing addresses of disk blocks to be accessed by a currently executed command, said execution queue employing an execution pointer for designating a block address to currently access data and a highest pointer indicating the highest block address in the execution queue, and a wait queue for storing addresses of disk blocks to be accessed by the next command after the commands accessing addresses of disk blocks stored in the execution queue, said method comprising the steps of:

(a) forming said execution queue in a circular form and arranging block addresses in a clockwise sequence in said execution queue;
(b) taking out one block address from said wait queue;
(c) setting the address taken from said wait queue as a highest block address when the block address taken out from said wait queue is greater than that designated by the highest pointer;
(d) determining whether the block address taken from said wait queue is greater than the block address designated by the execution pointer;
(e) if the block address from said wait queue is greater than that of the execution pointer, repeatedly comparing the block address taken from said wait queue and that of the highest pointer while moving the highest pointer counterclockwise until the block address from the wait queue is greater than the block address at the highest pointer, and then inserting the block address from said wait queue in the right of the position designated by the highest pointer;
(f) if the block address from said wait queue is not greater than that of the execution pointer, repeatedly comparing the block address from said wait queue and that of said execution pointer while moving the execution pointer counterclockwise until the block address from the wait queue is greater than the block address at the execution pointer, and then inserting the block address from said wait queue in the right of the position designated by the execution pointer;
(g) sequentially taking out the other addresses stored in said wait queue and rearranging the contents of said execution queue by repeating said steps (c) through (f) for each address stored in the wait queue; and
(h) moving the execution pointer in said rearranged execution queue in one direction and accessing the data corresponding to the block address designated by the execution pointer.

* * * * *